United States Patent [19]

Drago et al.

[11] 4,266,231

[45] May 5, 1981

[54] INK JET WITH RETRACTABLE ELECTRODE AND SECONDARY INK CATCHER

[75] Inventors: Gary A. Drago, Longmont; Arthur L. Mix, Jr.; Robert T. Ritchie, both of Boulder, all of Colo.

[73] Assignee: International Business Machines Corp., Armonk, N.Y.

[21] Appl. No.: 90,368

[22] Filed: Nov. 1, 1979

[51] Int. Cl.³ .............................................. G01D 15/18

[52] U.S. Cl. .......................................... 346/75; 346/1.1

[58] Field of Search ........................... 346/1, 75, 140 R

[56] References Cited

U.S. PATENT DOCUMENTS

| | | | |
|---|---|---|---|
| 3,346,869 | 10/1967 | Stone | 346/75 |
| 3,839,721 | 10/1974 | Chen et al. | 346/75 |
| 3,945,020 | 3/1976 | Kraus | 346/75 |
| 4,031,561 | 6/1977 | Paranjpe | 346/1 |
| 4,045,802 | 8/1977 | Fukazawa | 346/140 R |
| 4,112,435 | 9/1978 | Kattner et al. | 346/140 R |
| 4,144,537 | 3/1979 | Kimura et al. | 346/140 PD |
| 4,160,982 | 7/1979 | Keur | 346/75 |

OTHER PUBLICATIONS

Krause, K. A., Ink Jet Head, IBM Technical Disclosure Bulletin, vol. 19, No. 8, Jan. 1977, pp. 3216-3217.

Vesci, A., Flow Reversing Valve for Ink Jet Head, IBM Technical Disclosure Bulletin, May 1976, vol. 18, No. 12, pp. 4138-4139.

Seitz; H. K., Nozzle Cleaning Process, IBM Technical Disclosure Bulletin, Jul. 1977, vol. 20, No. 2, pp. 786-788.

*Primary Examiner*—George H. Miller, Jr.

*Attorney, Agent, or Firm*—Joscelyn G. Cockburn

[57] ABSTRACT

During the startup and/or shutdown cycle of an ink jet printer, a movable probe in the form of a thin hollow tube, is inserted into the flight path of the ink droplets. The tube is normally positioned relative to the droplets flight path. At the shutdown cycle, the charge electrode is removed from the vicinity of the jet streams. The undeflected droplets are caught by the hollow tube. The tube is then moved to a position next to the nozzle plate. The ink jet printer head may then be turned off and all ink is caught in the tube. At startup the sequence is reversed until the tube is back at its normal position.

19 Claims, 9 Drawing Figures

INK JET WITH RETRACTABLE ELECTRODE AND SECONDARY INK CATCHER

CROSS-REFERENCE TO OTHER PATENT APPLICATION

U.S. Patent Application Ser. No. 78,252, filed Sept. 24, 1979, entitled "Movable Ink Jet Gutter" discloses an ink jet printer wherein the gutter moves to the nozzle face of said printer to collect ink during a startup and a shutdown cycle. OF THE INVENTION 1. Field of the Invention The present invention relates to ink jet printers. In particular, the invention relates to methods and apparatus for enhancing the reliability of ink jet printer heads.

2. Prior Art

The use of ink jet printers for printing information on recording media is well known in the prior art. Conventional ink jet printers incorporate a plurality of electrical components and fluidic components. The components coact to perform the printing function. The fluidic components include a drop generator having a chamber for storing a printing fluid or ink and one or more ink nozzles interconnected to the chamber. chamber. A gutter assembly is positioned downstream from the nozzle plate in the flight path of ink droplets. The gutter assembly catches ink droplets which are not needed for printing on the recording medium. transducer within the drop generator vibrates at a frequency which forces the thread-like streams of ink which are initially ejected from the nozzles to be broken up into a series of ink droplets at a point within the vicinity of the nozzle plate. A charge electride assembly is positioned along the flight path of the ink droplets. The function of the charge electrode is to selectively induce a charge on the ink droplets as said droplets separate from the stream. A pair of deflection plates is positioned downstream from the charge electrodes. The function of the deflection plates is to deflect a charged ink droplet either into the gutter or onto the recording media.

One of the most pressing problems associated with ink jet printers of the above described type is that of head reliability. Most of the head failures occur at the instant when the heads are turned on (startup) or turned off (shutdown). It is believed that temporary stream instability is the prime cause of these reliability problems.

The causes for the stream instability are the startup/-shutdown dynamics associated with the streams and contamination. The term startup /shutdown dynamics refer to any form of sputtering, oozing, low velocity or misdirected ink stream. Among other things, these aberrations of the ink stream stem from the presence of air bubbles in the head and slow ink pressure transition within the head at startup or shutdown. Contamination results in partial or complete blocking of the nozzle hole which results in stream misdirection.

As was stated previously, the ink streams and/or ink droplets are projected through several electrode structures for deflection. The maximum clearance between the electrode structures and the ink stream and/or ink droplets are typically 0.005 inch. With this tight clearance, any sputtering or oozing etc. of the stream results in wetting the electrodes and ultimately electrical shorting.

One method described in the prior art to alleviate the above-described problem is the so-called "HARD START" method. This is accomplished with a high performance valve positioned in the nozzle head. The valve causes the pressure transition at the head to occur in submillisecond times. This approach largely avoids stream dynamics type failures. However, failures associated with stream blockage (contamination) are not addressed. Also, a highly tuned valve is needed which tends to increase the overall cost of the head. Finally preventative measures must be taken to ensure that air does not enter the head cavity. This approach places constraints on other drop generator components which tend to limit design freedom.

U.S. Pat. No. 3,839,721 discloses a method and apparatus used to prevent ink from drying at the nozzle during printer shutdown and to keep the charging electrodes and deflection plate free from ink spraying at pressure shutoff. In addition to the conventional gutter structure associated with an ink jet printer, a second gutter-like structure having a vapor chamber and with an opening having a partially closed lip portion, is positioned between the charge electrodes and the deflection electrodes. At shutdown time the charge electrodes are moved up out of the path of the jet streams and the second gutter-like structure is moved into the jet streams along a path traverse to the flight path of the droplets of the jet stream. In this position, ink issuing from the nozzle is caught by the gutter.

Although this prior art teaching is a satisfactory approach for its intended purpose, one of its shortcomings is that splashing of ink is not completely eliminated since the edge of the gutter-like structure crosses the flight path of active ink streams.

U.S. Pat. No. 4,031,561 discloses another technique used in the prior art to solve the startup and/or shutdown problem. According to the teaching of the patent at startup time, the charge plate is positioned to within 0.005 millimeters of the orifice plate. A purge liquid is used to flush the ink jet nozzle until the ink streams are properly established. Thereafter the purge fluid is replaced with ink. The lower surface of the charge plate is plated with a nonwetting coating. The purge liquids which accumulate on the lower surface are dried by blowing air on said surface.

Other prior art techniques require the use of a wiping device for removing ink from the nozzle and/or electrodes. Still other prior art methods require the use of a cap or nozzle that move over the nozzle orifice at shutdown and/or startup time. Detailed description of these techniques and methods are given in U.S. Pat. Nos. 3,945,020, 4,045,802 and IBM Technical Disclosure Bulletin Vol. 20, No. 2 July 1977, pgs. 786–788, and IBM Technical Disclosure Bulletin Vol. 18 No. 6, May 1976, pgs. 4138–4139.

Yet another technique used in the prior art to eliminate wetting of the electrode is disclosed in IBM Technical Disclosure Bulletin TDB Vol. 18, No. 6, November 1975, pgs. 1813–1814. In the publication, the nozzles are aimed away from the charge and deflection electrodes at startup and shutdown time.

SUMMARY OF THE INVENTION

It is therefore the object of the present invention to enable clean startup and/or shutdown of an ink jet printer in a more efficient and effective manner than was heretofore possible.

It is another object of the present invention to catch misdirected ink droplets generated by an ink jet printer at startup and/or shut down by minimizing interferring with the conventional components of said printer.

In the preferred embodiment of the invention, a thin hollow member or conduit is inserted between the plates of the deflection electrodes to a position in close proximity to the nozzle plate of the drop generator. The thin hollow member is used to catch undeflected ink drops during startup and/or shutdown of the nozzles. A suction means connected to the thin hollow member pulls the collected ink and conveys the same to an ink reservoir.

The thin hollow member, hereinafter called a probe, is fabricated from a pair of irregular shaped upper and lower skin members. The skin members are positioned in spaced relationship. A center spacer member is inserted between the skin members and support the same. The spacer and skin members are arranged to define a flow channel therebetween. The skin members are spot-welded to the spacer member to form a unified structure.

In one embodiment of the invention, the skin members are fabricated from porous material.

The foregoing and other objects, features and advantages of the invention will be apparent from the following more particular description of the preferred embodiment of the invention, as illustrated in the accompanying drawings.

DETAILED DESCRIPTION OF THE PREFERRED EMBODIMENT

As is used hereinafter, the term "Probe" means an ink catching vessel which is inserted into the droplets flight path of an ink jet printer to catch ink emanating from the drop generator at startup and/or shutdown.

Figure 1:
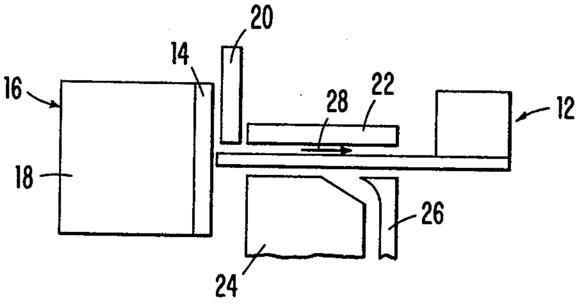
FIG. 1 shows a schematic view of an ink jet printer at startup. At startup the probe is positioned within the vicinity of the nozzle plate.

Referring now to the drawings, particularly FIG. 1, shows an ink jet printer according to the present invention. The ink jet printer of FIG. 1 is in the so-called start/stop mode. As will be explained subsequently, in the start/stop mode the probe assembly 12, which is transported along the droplet flight path to catch ink, is positioned next to nozzle plate 14. The ink jet printer includes a conventional multi-nozzle print head 16. Since multi-nozzle print head is well known in the prior art, the details of print head 16 will not be given. Suffice it to say that print head 16 includes a body portion 18 and a nozzle plate 14. The body portion 18 houses the writing fluid or ink and the crystal, which vibrates the ink or writing fluid so as to form droplets which are used for printing on a recording surface. The nozzle plate 14 is attached to body portion 18. The nozzle plate 14 supports a "member" or "membrane" having a plurality of openings through which ink is issued. The nozzle plate 14 is fabricated with a passage which interconnects the nozzles with the ink chamber. A charge electrode 20 is positioned downstream from the nozzle plate 14. The function of the charge electrode 20 is to induce a charge on the ink droplets as they separate from the stream in the vicinity of the nozzle plate. Positioned downsteam from the charge electrode is the deflection electrode. The deflection electrode includes the upper deflection plate 22 and the lower deflection plate 24. The function of the deflection electrode is to deflect charged droplets into the gutter assembly 26 or to print on a print medium (not shown). The function of the gutter assembly 26 is to catch writing fluid which is not needed for writing on the recording surface. The charge electrode and upper and lower deflection plates form a tunnel around the ink droplets emanating from the nozzle plate. The tunnel extends from the vicinity of the nozzle plate to the vicinity of a length of recording media (not shown). Generally, a fluid such as air is introduced into the tunnel. The fluid tends to reduce the adverse effect of aerodynamic drag on the droplets as they are propelled from the nozzle plate 14 along flight path 28 to print on the recording media (not shown).

As was stated previously, at startup and shutdown of the print head, ink tends to sputter and wet the components which surround the flight path. The present invention solves the problem by introducing probe assembly 12 into the tunnel and collecting all the ink issuing from the nozzle until it is shut down or until the streams are fully established.

Figure 2:
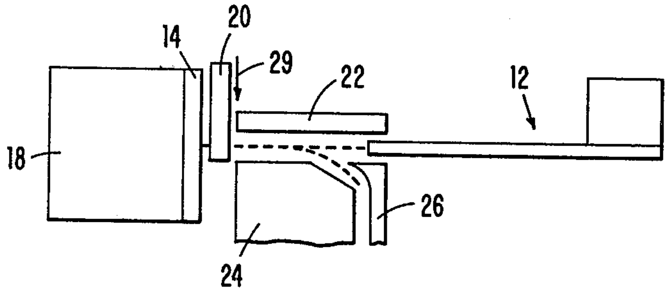
FIG. 2 shows a schematic view of an ink jet printer with the probe positioned at a transitional point. The droplets flight path into the probe and into the gutter are also shown.

Referring now to FIG. 2 the ink jet printer of FIG. 1 is shown in a transitional mode. The components of the ink jet printer of FIG. 2 are identical to the components previously discussed in FIG. 1. As such, common elements will be described by the same numeral. As in FIG. 1 the ink jet printer of FIG. 2 includes a print head having a body portion 18 and a nozzle plate 14. A charge electrode 20 is positioned downstream from the nozzle plate 14. It should be noted at this point that in FIG. 1 charge electrode 20 is in a retracted position. In the retracted position the charge electrode is in an inoperative state and does not charge the drops emanating from nozzle plate 14. However, in FIG. 2 the charge electrode 20 is transported in a direction shown by arrow 29 by a motive means (not shown). In FIG. 2 the charge electrode 20 is positoned relative to the flight path of the ink droplets and is operable for charging droplets as the droplets emerge from the nozzle plate. In the transitional mode of FIG. 2, the probe assembly 12 is retracted downstream from the nozzle plate but it is still positioned within the droplets flight path and catches undeflected drops of ink. As was stated previously, the undeflected drops of ink are used for writing information on a recording surface. The charged drops of ink which are not used for writing are deflected by upper deflection plate 22 and lower deflection plate 24, respectively, into the gutter assembly 26. It should be noted that before the probe is transported from the transitional point in FIG. 2 to its home positon, an electrical transition of all drops into the gutter assembly 26 is made. As such, mechanical gutter transition and accompanying ink splashing is eliminated. In FIG. 2 the droplets flight paths into the gutter and into the probe assembly are shown by broken lines.

Figure 3:
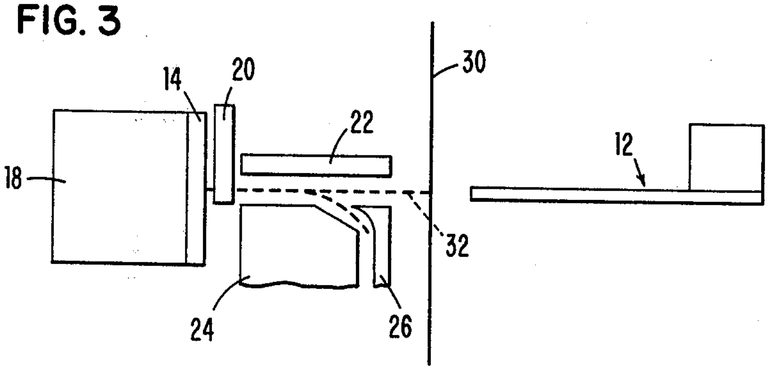
FIG. 3 shows a schematic view of an ink jet printer with the probe positioned in its home position.

FIG. 3 shows the ink jet printer in the so-called run mode. In the run mode the probe 12 is retracted from the droplets flight path (shown in broken lines). Preferably the probe is positioned behind the path of media to be written on. A transport belt 30 transports a recording media, such as paper, so that ink droplets 32 print an image on said paper. As in FIGS. 1 and 2, the ink jet printer includes a print head having a body portion 18 and a nozzle plate 14. The charge electrode 20 induces a charge on droplets emanating from nozzle plate 14. The charged droplets are deflected into gutter assembly 26 by the upper deflecton plate 22 and the lower deflection plate 24 respectively. The uncharged, undeflected ink droplets 32 are propelled along the flight path for writing data on the paper. The media transport belt 30 is fitted with an opening (not shown) through which the probe is retracted and/or extended.

It is worthwhile noting that although the "home position" of the probe is behind the paper path, this showing should not be construed as a limitation on the scope of the present invention. By way of example, the probe may be mounted so that it does not cross the paper path during its relative motion into and out of the droplets flight path.

Figure 4:
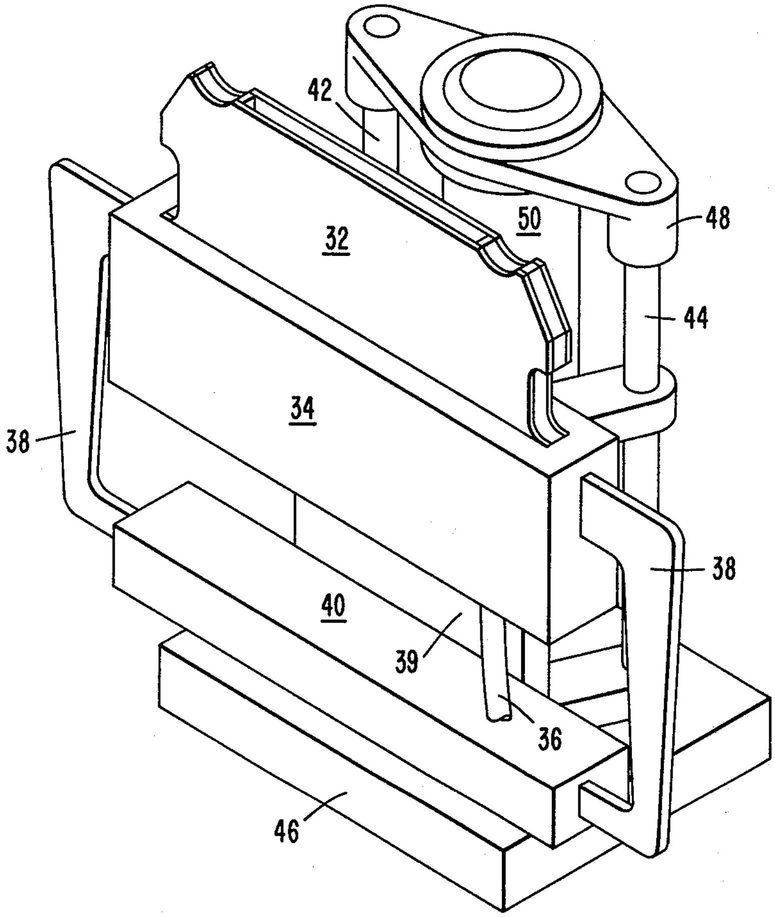
FIG. 4 shows a pictorial view of one embodiment of a probe assembly.
Figure 5:
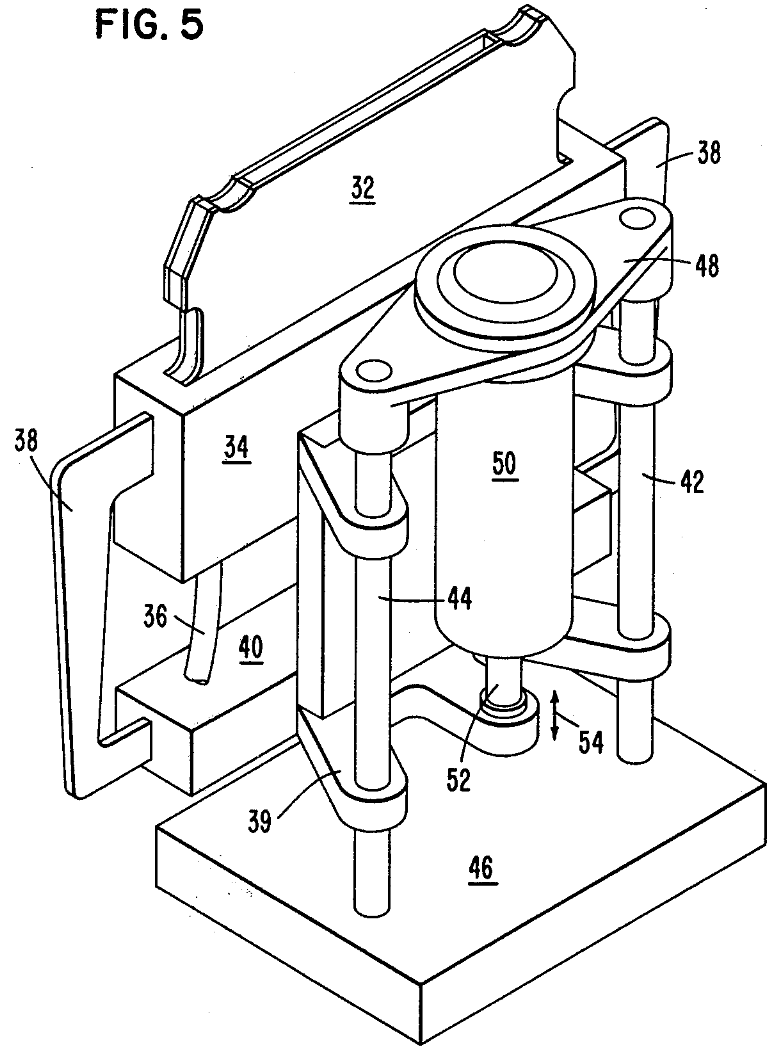
FIG. 5 shows the back view of the probe assembly in FIG. 4.

Referring now to FIG. 4 and FIG. 5, a pictorial front view and back view of one embodiment of a probe assembly is shown. As was stated previously, the probe assembly is transported between the upper and lower deflection plates of the charge electrode to a point within the vicinity of the nozzle plate to catch ink emitting from said plate and prevent the wetting of the charge electrode, the upper deflection plate and the lower deflection plate by said ink. Still referring to FIGS. 4 and 5, the probe assembly includes a probe section 32 connected to a probe block 34. The probe 32 is fabricated in the form of a thin hollow tube. The tube is fabricated from two thin pieces of material positioned in spaced apart relationship with a spacer member therebetween. A more detailed description of the probe will be given hereinafter. Suffice it to say that the probe is inserted into the flight path of the ink droplets and catch said ink droplets at startup and shutdown of the ink jet printer.

Still referring to FIGS. 4 and 5, the probe 32 is interconnected to the probe block 34. The ink which is caught by the probe is channeled into the probe block 34. A vacuum hose 36 (FIG. 4) conveys the ink from the probe block to the ink reservoir (not shown). The probe and the probe block are mounted on a flexible suspension 38. The flexible suspension allows the probe to adjust to the upper and lower walls of the tunnel as the probe is inserted towards the nozzle plate. The probe cleans the tunnel as it moves towards the nozzle plate. When the probe is fabricated with porous skin members, the cleaning capabilities are enhanced. The flexible suspension 38 is connected to a suspension support block 40. The suspension support block is connected to carriage or slider assembly 39 and the slider assembly is adapted for linear motion along linear guide rods 42 and 44 respectively. The guide rods 42 and 44 are mounted to end support blocks 46 and 48 respectively.

Figure 8:
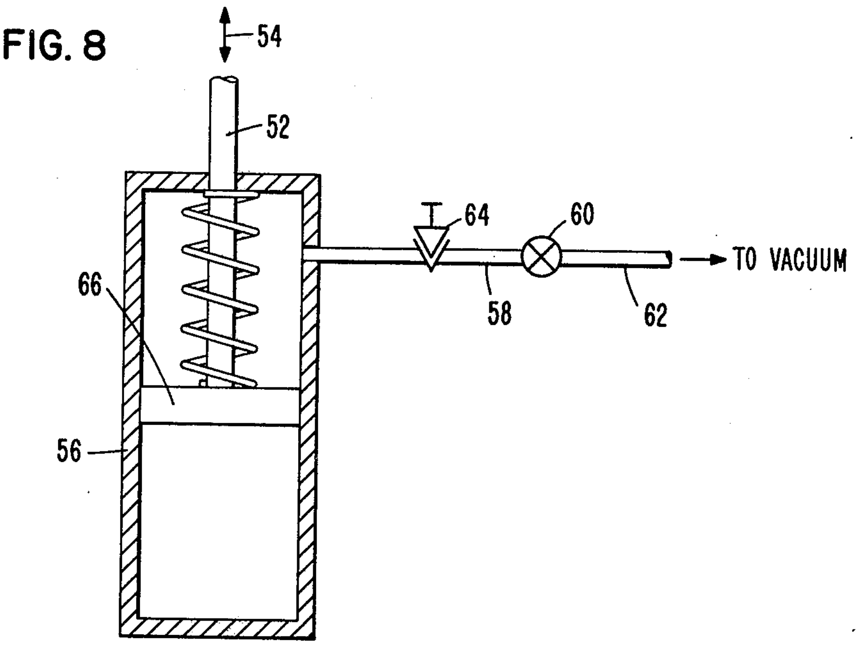
FIG. 8 shows one embodiment of the linear actuator.

When linear actuator 50 is enabled, shaft 52 moves in the direction shown by arrow 54 and transposes the probe 32 towards and away from the nozzle plate. Although a plurality of linear actuators may be used in the preferred embodiment of this invention, the linear actuator is a solenoid controlled air cylinder. FIG. 8 shows a schematic of the linear actuator. The linear actuator includes a piston assembly 66 and a vacuum chamber 56. The vacuum chamber is fitted with an opening to which a vacuum hose 58 is connected. A solenoid valve 60 controls the vacuum entering and leaving hose 58. A second hose 62 interconnects the solenoid valve to a vacuum supply source (not shown). In operation, an electrical signal is generated by a controller (not shown). The signal activates the solenoid valve to open or close the same to control the flow of air into and out of the vacuum chamber 56. A throttle orifice 64 further controls the rate at which air is allowed to enter the vacuum chamber and hence the rapidity with which the piston 66 moves in its to and fro motion. The vacuum chamber 56 is fitted with a spring biased piston 66. The piston includes shaft 52. The shaft 52 is attached to the carriage or slider assembly 30 (FIGS. 4 and 5). As vacuum is allowed to enter and leave vacuum chamber 56, the piston together with its attachment, moves in a linear path denoted by arrow 54.

Figure 9:
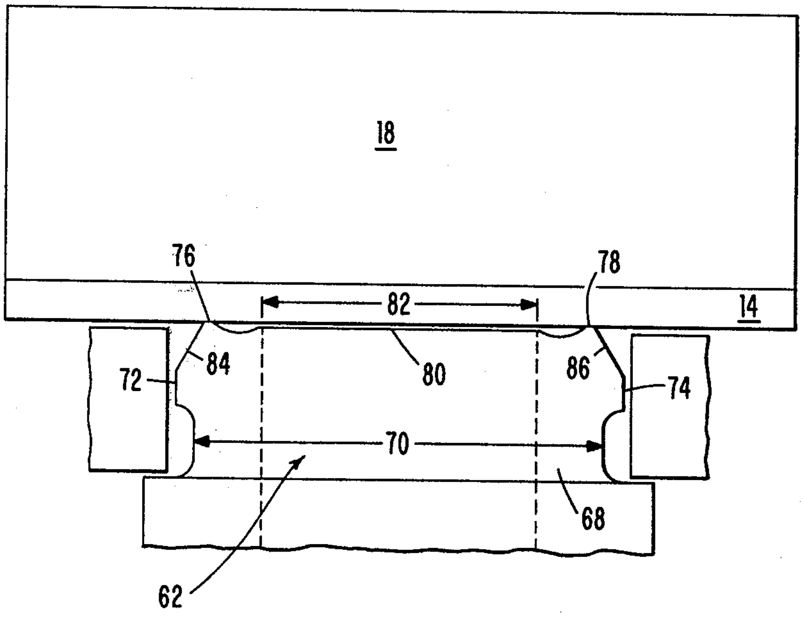
FIG. 9 shows a probe positioned within the vicinity of the nozzle plate.

Referring to FIG. 9, a side profile of probe 32 is shown. The diagram shows the probe fully inserted and in registration with the nozzle plate of the ink jet head. As was stated previously, the droplet flight path from the nozzle plate to the recording surface is substantially a closed channel bounded laterally as is shown in the figure and bounded on both sides in a plane perpendicular to the page. The probe is fashioned in the shape of a thin hollow tube assembly. The tube assembly includes two relatively flat thin members only one of which is shown in FIG. 9 and identified as skin 62. Each of the skin members has a relatively flat outside surface only one of which is shown and identified in FIG. 9 as surface 70. A spacer member (not shown) is positioned between the two skin members. The assembly is completed by fastening the skin members to the spacer members. The flat surfaces only one of which is shown and identified in FIG. 9 as surface 70, aligns the probe in a plane perpendicular to the page. In order to align the probe in a lateral direction or a direction horizontal to the perpendicular direction the probe is fabricated with lateral registration surfaces 72 and 74 respectively. Similarly, the probe is fabricated with leading registration edges or surfaces 76 and 78 respectively. As is evident in FIG. 9 registration surfaces 76 and 78 are relatively flat so that they can align with the nozzle plate. The registration surfaces 76 and 78 extend about 0.1 millimeters above surface 80. By extending the registration surface above surface 80 the probe achieves proper alignment with the nozzle plate. However, the alignment contact occurs outside of the area where the fragile nozzles are mounted to the nozzle plate. The area is denoted approximately by line 82. Stated another way, the probe does not contact the nozzle plate in the area where the fragile nozzles are. With this design all the ink which is emanating from the nozzles is collected in the probe. However, since there is no contact between the probe and the nozzle area, damage to said wafer is minimized. A pair of semi-circular notches are fabricated on the leading end of the probe. The semicircular notches, together with the slant surfaces 84 and 86 respectively, tend to narrow the surface areas of registration, surfaces 76 and 78 respectively. As a result of the narrow surface areas which contacts the nozzle plate, the effect of capillary action which results in ink entering the crevices between the registration surfaces 76, 78 and surface 80 and the nozzle plate is significantly minimized, if not eliminated. In other words all the ink which is outputted from the nozzle plate at startup and/or shutdown is collected directly into the probe.

Stated another way, the semicircular notches segregate the channel section of the probe from the registration surfaces of the probe. Since the only contact between the probe and the nozzle plate occurs at a point outside the nozzle area where ink exits from the drop generator, all ink is caught in the probe and does not enter the crevices between the registration surface and the nozzle plate.

Figure 6:
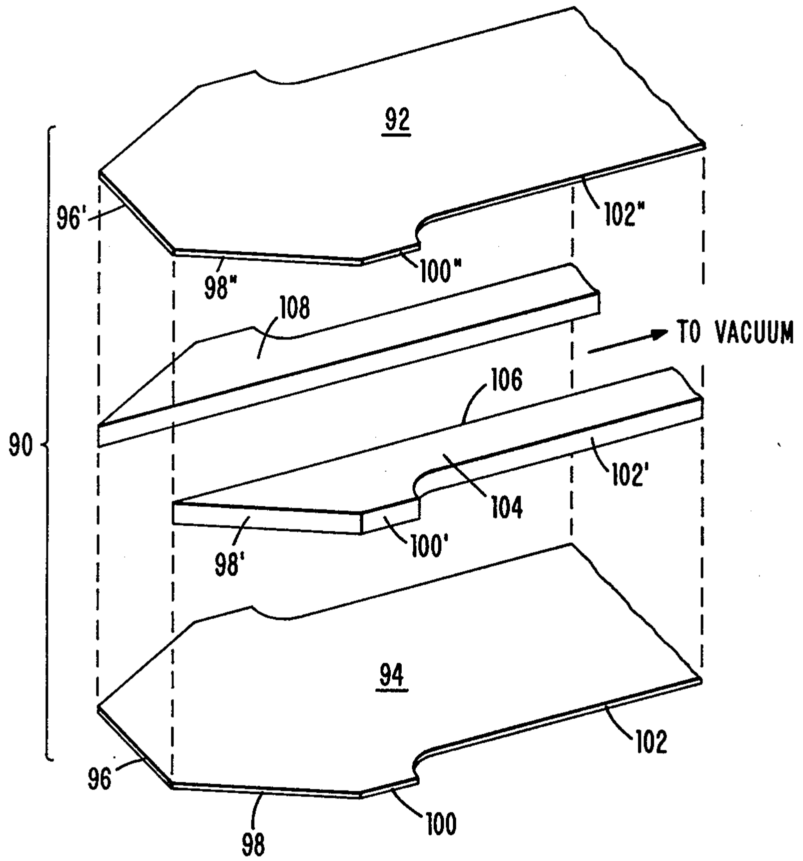
FIG. 6 shows an alternate embodiment of a probe.

FIG. 6 shows an alternate embodiment of a probe in disassembled form. The showing in FIG. 6 is helpful in teaching how to fabricate and assemble the probe. The probe 90 includes an upper skin member 92 and a lower skin member 94. The lower skin member 94 is machined with an entry edge 96, a slant edge 98, a lateral registration edge 100 and a recessed edge 102. Left spacer member 104 is machined with a planar edge 106, and slant edge 98', registration edge 100' and recessed edge 102'. Similarly, upper skin member 92 is fabricated with entry edge 96', slant edge 98'', registration edge 100'' and recessed edge 102''. In a similar manner, the opposite edges of lower skin member 94, upper skin member 92 and the right spacer member 108, respectively, are fabricated with matching edges. In assembling the left spacer member 104 and the right spacer member 108 are positioned in spaced relationship and in intimate contact with the lower skin member and the upper skin member. The alignment is such that the planar edges of the right and left spacer members respectively are in alignment and form the channel through which the ink is removed by the vacuum. Likewise, slant edge 98' aligns with slant edge 98 and slant edge 98''. Similarly, edges 100, 102, 100', 102'100'' and 102'' are aligned. The structure is then fastened to form a unified probe. Although a plurality of fastening means can be used for attaching the skins to the spacers in the preferred embodiment of the invention, spot welding is used for the attachment.

In an alternate embodiment of the probe, a single two-pronged spacer member is used to separate the skin members. The spacer member is fabricated from a thin rectangular member. A U-shaped void is formed in the central portion of the rectangular member. The open side of the "U" concides with one end of the member while the closed side of the "U" is positioned about the center of the rectangular member. A circular void is formed in the member so that is circumference coincides with the closed side of the "U". As such, the spacing between the skin members is created by the two-pronged end of the rectangular member while the flow channel is created by the U-shaped and circular void respectively. Of course, it is within the skill of the art to use other fabrication techniques to manufacture the ink catching vessel or probe without departing from the scope of the present invention.

Figure 7:
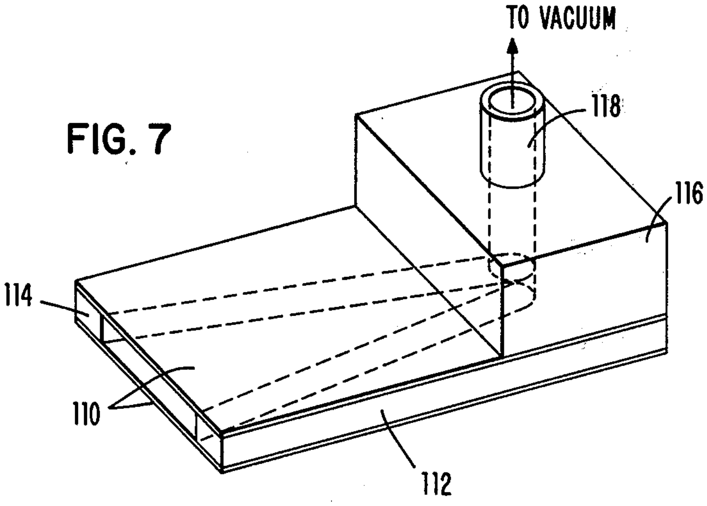
FIG. 7 shows another embodiment of a probe.

Referring now to FIG. 7 another embodiment of a thin probe is shown. This embodiment is substantially rectangular in shape. The probe includes a pair of thin skins 110 separated by spacer members 112, and 114 respectively. As before, the thin skins are attached to the spacer member to form a unified structure. A reservoir 116 is attached to the probe for collecting ink. Ink is pulled from the reservoir by means of a vacuum (not shown) through tube 118.

OPERATION

In operation with the ink jet printer in the run mode, the probe is retracted in its home position behind the transport belt 30 (see FIG. 3). Although in the embodiment shown, the home position for the probe is behind the paper path, it is within the skill of the art to design the probe assembly so that its home position is in front of the transport belt 30. Some of the ink droplets which are generated at nozzle plate 14 are charged by charge electrode 20 and are deflected into gutter 26 by deflection electrode 22 and 24. The undeflected drops 32 are propelled onto the paper for recording information thereon. The charge electrode is then activated so that a charge is placed on all droplets of ink in all the ink streams. As such, all the ink is now deflected into the gutter by the deflection plates. At shutdown time the belt is transported so that a slot whch is fabricated therein (not shown) is positioned in alignment with probe 12. The probe is then inserted by the transport mechanism through the hole in the paper transport belt and it is now positioned at the point shown in FIG. 2. At this point, the charge electrode is deactivated electrically (that is, the voltage on the charge electrode is turned off) and moved from the vicinity of the droplets flight path by a conventional transport means (not shown). With the charge electrode electrically deactivated, all the droplets are now uncharged and are propelled into the probe assembly. The probe assembly is then transported along the flight path towards the nozzle plate (see FIG. 1). As such, all the ink which is outputted from the nozzle plate is collected in the probe and does not wet the adjoining components to cause malfunction. At startup time, the process steps are reversed. That is, the probe is transported away from the nozzle plate to a point shown in FIG. 2. The charge electrode 20 is transported into its normal position. A charge is imparted to the droplets, and as a result they are deflected by the deflection electrode into the gutter. The probe is then pulled back to its home position shown in FIG. 3.

One of the advantages associated with the invention is that the ink droplets are electrically transferred from the probe assembly to the gutter assembly and vice versa. As such, the splashing of ink due to ink droplets colliding on the edges of the probe is eliminated.

Stated another way, there is no mechanical transition of the probe across the ink droplets flight path. Hence, splashing of ink due to collision of ink droplets on the probe is eliminated.

It should also be noted that although the transition of the ink from the gutter assembly to the probe assembly and vice versa, is achieved electrically, it is within the skill of the art to use other means to effectuate transition of the ink without departing from the scope or spirit of the present invention. By way of example, the ink may be transferred magnetically.

What is claimed is:

1. An ink jet printer comprising in combination:

a print head, having a cavity with a printing fluid therein and at least one orifice interconnecting the cavity with the face of the print head, said orifice being operable to convey a thread-like stream of ink from which a plurality of ink droplets are being generated and are being propelled along a flight path for printing on a media;

a movable charge electrode positioned relative to the flight path;

means for moving said charge electrode;

a thin tube-like device positioned relative to the droplets flight path and operable for catching the ink; and means for moving the thin tube-like device from a first position along a path parallel to the droplets flight path to a second position next to the face of the print head.

2. The ink jet printer of claim 1 wherein the thin tube-like device includes an upper planar skin member;
- a lower planar skin member;
- a first spacer member positioned between the upper and lower skin members; and
- a second spacer member positioned between said skin members in spaced relationship with the first spacer member to define a flow channel therebetween, with the members connected to form a unified structure.

3. The catching means of claim 2 wherein the planar skin members are fabricated from porous material.

4. A thin tube-like device for catching ink in an ink jet printer comprising:
- an upper planar skin member;
- a lower planar skin member;
- a first spacer member positioned between the upper and lower skin members;
- a second spacer member positioned between said skin members in spaced relationship with the first spacer member to define a flow channel therebetween, with the members connected to form a unified structure; and
- means coupled to said flow channel and operable to collect ink therefrom.

5. Ink catching device for use with an ink jet printer comprising:
- a first thin member;
- a second thin member, said first and second thin members being configured in spaced relationship;
- a spacer means having a predetermined thickness defining the thickness of the catching device, said spacer means being positioned intermediate with the thin members and a pair of side registration surfaces positioned outwardly; and
- means for joining the members to form a unified structure.

6. The device as claimed in claim 5 further including a registration surface fabricated on the front of said device, said surface being operable for aligning the device with an ink jet head to collect ink therefrom.

7. A method of operating a nonimpact printer so that print fluid emanating from a print head and traveling along a flight path towards a print medium does not wet printer components at shutdown, said method comprising the following steps:
- (1) positioning an ink catching vessel within the vicinity of the flight path;
- (2) inserting the catching vessel in the flight path to catch all ink emanating from said head;
- (3) retracting a charge electrode from the vicinity of the flight path;
- (4) moving the vessel along a path parallel to the flight path to the immediate vicinity of the head; and
- (5) shutting down the head.

8. The method as claimed in claim 7 further including the steps of:
- (6) activating the charge electrode to charge ink droplets emanating from the head with step 6 occurring prior to the occurrence of step 3 of claim 7; and
- (7) deflecting all the droplets into a gutter assembly with step 7 occurring prior to step 4 of claim 7.

9. A method of operating a nonimpact printer so that print fluid emanating from a print head and traveling along a flight path towards a print medium does not wet printer components at startup, said method comprising the following steps:
- (1) starting up the head to establish one or more print fluid streams;
- (2) retracting the vessel, from the vicinity of the print head, along a path parallel to the flight path; and
- (3) moving the charge electrode to a position next to the print head.

10. The method as claimed in claim 9 further including the steps of:
- activating the charge electrode to charge ink droplets streams emanating from the head;
- deflecting all the droplets streams into a gutter assembly; and
- transporting the vessel to its home position.

11. An improved ink jet printer comprising:
- a print head having a nozzle plate with one or more nozzles therein, said one or more nozzles being operable to emit one or more streams for writing on a media positioned downstream from the nozzles;
- deflection plates disposed between the nozzles and the media, said deflection plates being disposed in spaced relation and operable to define a flight path therebetween for said droplets;
- a movable charge electrode positioned within the vicinity of the flight path;
- a movable thin hollow tube positioned relative to the droplets flight path and operable to move between the deflection plates in a plane parallel to said plates;
- a flexible suspension being coupled to said tube; and
- actuator means for transporting the hollow tube into and out of the flight path.

12. The apparatus of claim 11 wherein the thin hollow tube includes front registration surfaces, lateral registration surfaces, said front registration surfaces being substantially perpendicular to the flight path of the ink droplets.

13. A method of operating a nonimpact printer so that print fluid emanating from a print head and traveling along a flight path towards a print medium does not wet printer components at startup and shutdown, said method comprising the following steps:
- (1) positioning an ink catching probe within the vicinity of the flight path;
- (2) deflecting all print fluid into a gutter catching assembly;
- (3) inserting the catching probe into the flight path;
- (4) directing all print fluid into the catching probe; and
- (5) transporting the catching probe along the flight path to a point in the vicinity of the print head whereby all ink emanating from said head is being caught by the catching probe.

14. The method of claim 13 further including the following steps:
- (1) establishing proper operation of all streams emitting from said print head;
- (2) retracting the probe along the flight path to a transitional zone;
- (3) deflecting all ink from the catching probe into the gutter catching assembly; and
- (4) retracting the catching probe to normal home position.

15. The method according to claim 14 wherein the ink is being deflected electrically.

16. An apparatus for use with an ink jet printer having an upper and a lower deflection plate for influencing the flight path of ink droplets emanating from a print head, said apparatus comprising in combination:

an ink catching assembly including a thin hollow tube for inserting between the upper and lower deflection plates of said printer;

a suspension system operably connected to the ink catching assembly;

transport assembly operably connected to the suspension system;

a frame operable for supporting the transport assembly; and motive means mounted to the frame and operable to drive the transport assembly along a predetermined path.

17. In an ink jet printer having a print head with a multiple nozzle plate thereon, and operable to generate a plurality of ink streams, a charge electrode positioned relative to the nozzle plate, a deflection electrode positioned downstream from charge electrode, a gutter assembly positioned downstream from the deflection electrode, an apparatus for catching ink at startup and/or shutdown, said apparatus comprising:

a first ink catching means including the gutter assembly positioned to catch ink not needed for printing on a recording medium;

a second ink catching means mounted relative to the nozzle plate, and operable to catch ink at startup and/or shutdown of said print head;

means for deflecting the ink streams between the catching means; and means for selectively moving the second ink catching means towards and away from the nozzle plate whereby all ink emanating from said nozzle plate is being caught by the ink catching container.

18. The ink jet printer of claim 17 wherein the means for deflecting the ink streams include electrical means such as the charge electrode and the deflection electrode.

19. An improved ink jet printer comprising:

a print head having a nozzle plate with a plurality of nozzles therein, said nozzle being operable to emit a plurality of ink droplets for writing on a media positioned downstream from the nozzles;

deflection plates disposed between the nozzles and the media, said deflection plates being operable to define a flight path for said droplets;

a movable charge electrode positioned within the vicinity of the flight path;

a movable thin hollow tube, positioned relative to the droplets flight path, said tube being operable to move in a plane parallel to the plane of the droplets flight path to catch ink therefrom; and actuator means for transporting the hollow tube into and out of the flight path.

* * * * *

UNITED STATES PATENT AND TRADEMARK OFFICE
CERTIFICATE OF CORRECTION

PATENT NO. : 4,266,231

DATED : May 5, 1981

INVENTOR(S) : G. A. Drago et al.

It is certified that error appears in the above-identified patent and that said Letters Patent are hereby corrected as shown below:

Column 1, line 11, after "cycle." insert --BACKGROUND--

Column 1, line 24, after "chamber." delete "chamber."

Column 1, line 28, after"medium." insert --In order to create the ink droplets an electrical--.

Column 1, line 33, delete "electride" and insert --electrode--.

Column 7, line 47, delete "is" and insert --its--.

Signed and Sealed this

*Fourteenth* Day of *July 1981*

[SEAL]

*Attest:*

GERALD J. MOSSINGHOFF

*Attesting Officer* *Commissioner of Patents and Trademarks*